United States Patent [19]
Wei

[11] Patent Number: 5,632,529
[45] Date of Patent: May 27, 1997

[54] PLATED VEHICLE WHEEL HAVING NON-PLATED TIRE BEAD SEATS

[75] Inventor: Daniel C. Wei, Ann Arbor, Mich.

[73] Assignee: Hayes Wheels International, Inc., Romulus, Mich.

[21] Appl. No.: 423,179

[22] Filed: Apr. 18, 1995

[51] Int. Cl.[6] ............................................. B60B 21/00
[52] U.S. Cl. ............................................................. 301/95
[58] Field of Search ............................ 301/1, 5.1, 95–98, 301/63.1; 152/379.3, 381.4, 513, 514; 427/156, 282, 284, 286, 287, 300, 259, 272; 118/504, 505; 428/31, 937; 29/894, 894.32, 894.345

[56] References Cited

U.S. PATENT DOCUMENTS

| | | | |
|---|---|---|---|
| 4,421,821 | 12/1983 | Matsubara et al. | 301/96 X |
| 4,628,858 | 12/1986 | King et al. | 118/504 |
| 5,364,656 | 11/1994 | Koorey | 427/142 |
| 5,456,946 | 10/1995 | Snellman | 427/282 X |

*Primary Examiner*—Russell D. Stormer
*Attorney, Agent, or Firm*—MacMillan, Sobanski & Todd

[57] ABSTRACT

A plated vehicle wheel having non-plated tire bead seats and a process for forming same. The process includes masking a portion of the tire bead seats before plating the wheel. The process also includes forming the tire bead seats with an oversized diameter. Following plating, the tire bead seats are machined to a final diameter. The process can further include thermally depositing a layer of a ceramic material over a portion of the tire bead seat surface. The plating does not adhere to the ceramic material.

6 Claims, 3 Drawing Sheets

PLATED VEHICLE WHEEL HAVING NON-PLATED TIRE BEAD SEATS

BACKGROUND OF THE INVENTION

The present invention relates in general to vehicle wheels and in particular to a plated vehicle wheels.

Vehicle wheels include an annular wheel rim which is adapted to carry a pneumatic vehicle tire. The ends of the wheel rim include annular recesses which form a pair of tire bead seats. When a tire is mounted on the wheel rim, the tire bead seats support tire beads which are formed on the inside edge of the walls of the tires. An air-tight seal is formed between the tire bead seats and the tire beads to retain inflation air within the tire.

Vehicle wheels also include a circular wheel disc which can be formed across the outboard end of the wheel rim or recessed within the wheel rim. The wheel disc includes a wheel hub having a central pilot hole and a plurality of wheel stud holes formed therethrough for mounting the wheel upon a vehicle. Typically, the wheel disc also includes a plurality of wheel spokes connecting the wheel hub to the rim.

In the past, vehicle wheels have usually been fabricated by attaching a stamped steel disc to a rolled steel rim. Vehicle wheels also have been cast or forged from steel billets. Increasingly, however, vehicle wheels are being formed from light weight metals, such as aluminum, magnesium, titanium, or alloys thereof. Such light weight metal wheels can be cast or forged as a one-piece wheel or assembled by attaching a full or partial wheel disc to a wheel rim. A wheel assembled from a wheel disc and rim formed from dissimilar metals is referred to as a bimetal wheel. For example, a cast aluminum alloy full face wheel disc, which includes the outboard tire bead seat, can be welded indirectly to a partial rolled steel wheel rim. A weld anchor formed from a ferrous metal is usually included in the wheel disc to facilitate forming the weld between the wheel disc and the wheel rim. Additionally, wheels can be formed from plastic.

With all wheels, regardless of the material used to form the wheel, the outer surface of the wheel disc is visible when the wheel is mounted upon a car. Accordingly, the wheel disc can be formed having a pleasing aesthetic shape. The wheel disc outer surface may be machined to form a smooth surface. Frequently a surface finish which typically has a decorative high luster is applied to the surface of the wheel disc or the entire wheel.

One type of surface finish, which is used extensively, is formed by chrome plating the surface of the wheel. During chrome plating, a layer of chromium, which can be polished to a high luster, is deposited upon the surface of the wheel. Known methods for forming a layer of chromium on a wheel surface are complex and typically require a number of discrete steps involving chemical deposition of multiple layers of metal onto the wheel surface.

A typical chrome plating process includes preparing the wheel by immersion in a solvent bath. The solvent bath removes oils and dirt from the wheel surface. The oils and dirt could inhibit adhesion of metal deposits to the wheel surface. The wheel also is prepared by immersion in a chemical bath to dissolve any surface oxides. This further improves the adhesion of metal deposits to the wheel surface. The wheel is then rinsed by immersion in a water bath or spraying with a high pressure water jet. The preparatory steps of removing oil and dirt, dissolving surface oxides and flushing are typically referred to as cleaning the wheel surface.

After cleaning, the chrome plating process begins with the total immersion of the wheel in a chemical bath containing a solution of nickel. During immersion, a thin first layer of nickel is chemically deposited upon the wheel surface to enhance adhesion of successive metal layers thereto. This first nickel layer tends to have a relatively uneven surface. Accordingly, a copper layer is chemically deposited over the first nickel layer, usually by immersion of the wheel in another chemical bath which contains copper in solution. The copper layer fills in uneven portions of the first nickel layer, forming a smooth surface. To further enhance the surface smoothness, the copper layer can be buffed. A second nickel layer, often referred to as a semibright nickel layer is chemically deposited over the buffed copper layer. The semibright nickel layer provides corrosion resistance. Next, a layer of nickel containing sulfur is chemically deposited over the semibright nickel layer as a sacrificial corrosion layer. A final bright nickel layer is chemically deposited onto the wheel surface to provide reflectivity and brightness to the wheel surface.

The chrome plating process continues with the deposit of multiple chromium layers over the nickel and copper layers. A first chromium layer is chemically deposited over the bright nickel layer. This layer is usually formed from discontinuous chrome, or pixy dust, to provide a more durable surface layer. A second layer of chromium is chemically deposited over the first chromium layer to prevent nickel fogging.

During the chrome plating process, each successive metal layer is typically deposited onto the wheel surface during total immersion of the wheel in a chemical bath containing a solution of the particular metal. Thus, the entire surface of the wheel, including the surfaces of the tire bead seats, is plated. Each successive metal layer is chemically bonded to the preceding layer to provide a durable and attractive decorative surface coating on the wheel. Furthermore, the wheel and the chemical bath are usually electrically charged with opposite polarities to accelerate the plating process. When this is done, the metal layers are electro-deposited onto the wheel surface.

SUMMARY OF THE INVENTION

This invention relates to a plated vehicle wheel having non-plated tire bead seats and a process for plating a vehicle wheel wherein the tire bead seats are not plated.

When a tire is mounted upon a chrome plated vehicle wheel and the wheel is attached to a vehicle, there is an interaction between the tire beads and the chrome plating on the tire bead seats as the tire and wheel roll on a road surface. After a period of use, this interaction can cause peeling and cracking of the chrome plating on the tire bead seats. Eventually, the peeling and cracking can form axial channels in the chrome plating which extend across the entire tire bead seat. These channels form gaps in the seal between the tire bead and the tire bead seats, allowing the tire inflation air to leak from inside the tire. If the inflation air is not replaced, the tire becomes deflated.

The present invention addresses the above problem by excluding the plating from at least a portion of the tire bead seats. Accordingly, the invention contemplates a vehicle wheel which includes a wheel rim. The wheel rim defines a wheel rim surface. The wheel rim has annular outboard and inboard tire bead seats formed therein for supporting outboard and inboard tire walls, respectively.

The wheel also includes a generally circular wheel disc which is disposed across the wheel rim. The wheel disc defines a wheel disc surface. The wheel has a layer of metal plating formed on a portion of at least one of the wheel rim and disc surfaces which excludes at least one of the tire bead seats. Additionally, an optional coating can be applied over a portion of the wheel surface to seal the boundary formed between the edge of the plated surface and the original wheel surface.

The invention also contemplates a process for excluding plating from a portion of the surface of at least one of the tire bead seats. The process includes masking the portion of the tire bead seat which is to be excluded from plating before plating the wheel. The masking is operative to prevent plating a metal onto the masked surface. At least one layer of metal is plated onto a portion of the wheel surface. Following plating of the wheel, the masking is removed, exposing the original tire bead seat surface. The optional coating can then be applied over the boundary between the plated metal and the original wheel surface.

The invention further contemplates an alternate process wherein the wheel is formed with tire beads which have oversized diameters. A portion of the wheel surface is plated. Following plating, the wheel beads are machined to a final diameter. During machining, any plating which may have been formed upon the bead seats is removed.

The invention also contemplates another alternate process in which a masking material is deposited with a thermal spray gun onto a portion of the tire bead seat surfaces before the wheel is plated. During the plating process, the plating will not adhere to the masking material.

Objects and advantages of the invention will become apparent from the following detailed description of the invention and the accompanying drawing.

DETAILED DESCRIPTION OF THE PREFERRED EMBODIMENT

Figure 1:
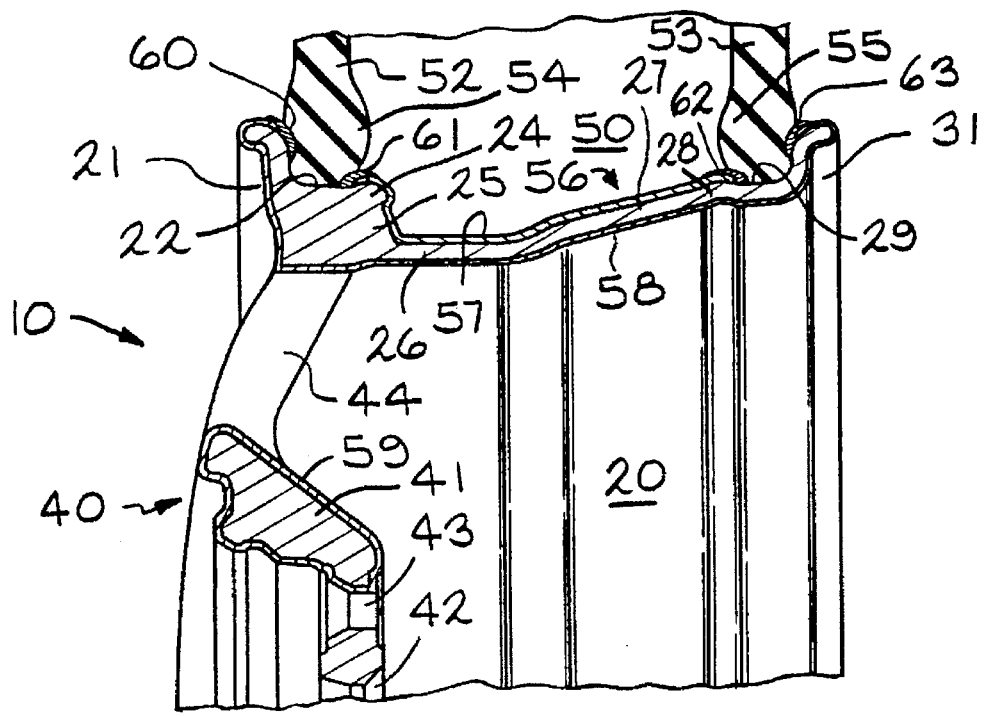
FIG. 1 is a fragmentary sectional view of a vehicle wheel formed in accordance with the invention.

Referring now to FIG. 1, there is shown a fragmentary sectional view of a vehicle wheel 10 formed in accordance with the invention. In the preferred embodiment, the wheel 10 is formed in a single piece by a conventional casting or forging process from an aluminum alloy. However, it will be appreciated that the invention can also be practiced upon a wheel fabricated from a plurality of components (not shown). Additionally, the invention can be practiced on wheels formed from other light weight metal alloys, such as magnesium and titanium alloys, from a steel alloy, or a plastic.

The wheel 10 has an annular wheel rim 20 which is adapted to carry a vehicle tire. The outboard end of the wheel rim 20 has an outboard tire bead retaining flange 21 formed thereon which extends in an outward radial direction. The outboard tire bead retaining flange 21 is adjacent to an annular outboard tire bead seat 22 which has a smooth surface. The tire bead seat 22 is usually turned on a lathe to obtain the desired smoothness. The reason for the smooth surface will be discussed below. The outboard tire bead seat 22 terminates in an annular outboard safety bead 24. The outboard safety bead 24 is connected by a radial drop well wall 25 to a recessed annular drop well 26. The drop well 26 extends axially to an annular leg portion 27 of the wheel rim 20. The inboard end of the leg portion 27 is formed as an annular inboard safety bead 28. The inboard safety bead 28 is adjacent to an inboard tire bead seat 29. Similar to the outboard tire bead seat 22, the inboard tire bead seat 29 has a smooth surface. The inboard tire bead seat 29 terminates in an inboard tire bead retaining flange 31 which extends in an outward radial direction from the inboard end of the wheel rim 20.

The wheel 10 also has a wheel disc 40 which is formed across the outboard end of the wheel rim 20. The wheel disc 40 includes a wheel hub 41 having a central pilot hole 42 and a plurality of wheel lug holes 43 (one shown) formed therethrough. A plurality of spokes 44 (one shown) extend radially from the hub 41 to the wheel rim 20. While the wheel disc 40 is illustrated as being formed across the end of the wheel rim 20, it will be appreciated that the invention can be practiced on a wheel having a wheel disc recessed within the wheel rim (not shown).

FIG. 1 also includes a fragmentary sectional view of a conventional pneumatic vehicle tire 50 which is mounted on the wheel rim 20. The tire 50 is included in FIG. 1 for illustrative purposes only and is not part of the invention. The tire 50 includes outboard and inboard tire walls, which are labeled 52 and 53, respectively. The tire walls 52 and 53 terminate in annular outboard and inboard tire beads, which are labeled 54 and 55, respectively. As shown in the figure, the tire beads 54 and 55 have a bulbous cross section.

When the tire 50 is mounted upon the wheel rim 20 and inflated, the outboard tire bead retaining flange 21 and the outboard tire safety bead 24 cooperate with the outboard tire bead 54 to retain the outboard tire wall 52 on the wheel 10. The outboard tire bead seat 22 supports the outboard tire wall 52 while the outboard tire wall 52 urges the outboard tire bead 54 against the outboard bead seat 22 to form an air-tight seal therebetween. The air-tight seal is enhanced by the smooth surface of the outboard tire bead seat 22. Similarly, the inboard tire bead retaining flange 31 and the inboard tire safety bead 28 cooperate with the inboard tire bead 55 to retain the inboard tire wall 53 on the wheel rim 20. The inboard tire bead seat 29 supports the inboard tire wall 53 while the inboard tire wall 53 urges the inboard tire bead 55 against the inboard bead seat 29 to form an air-tight seal therebetween.

As described above, it is often desirable to enhance the appearance of vehicle wheels by applying a decorative surface finish to the wheel surface. One type of surface finish, which is used extensively, is formed by chrome plating the wheel. As also described above, prior art processes for chrome plating a vehicle wheel usually involve total immersion of the wheel in successive chemical baths to deposit multiple layers of metal onto the wheel surface. Thus, the entire surface of the wheel 10, including the surfaces of the tire bead seats 22 and 29, is plated. Also as described above, peeling and cracking can develop in the chrome plating on the bead seats 22 and 29 after a period of usage. If this peeling and cracking extends across one of the bead seats, tire inflation air might escape from the tire.

The present invention contemplates an improved chrome plated vehicle wheel having non-plated tire bead seats. Thus, when a tire is mounted upon the improved wheel, the air-tight seal is maintained between the tire beads and the wheel tire bead seats. The present invention further contemplates that portions of the wheel surfaces adjacent to the tire bead seats also may be excluded from being chrome plated.

In the following discussion, the term "chrome plating" refers to multiple layers of metal successively deposited upon a surface to provide a decorative chromium finish. The number of layers and the specific metals used in each layer to form the finish can vary.

The preferred embodiment of the invention is illustrated in FIG. 1, which shows a layer of decorative chrome plating 56 extending over a portion of the surface of the wheel 10. As shown in FIG. 1, the chrome plating 56 is excluded from the surfaces of the tire bead seats 22 and 29. The chrome plating 56 also is excluded from portions of the tire bead retaining flanges 21 and 31 and safety beads 24 and 28 which are adjacent to the tire beads 54 and 55. Thus, in the preferred embodiment, a first portion 57 of the chrome plating 56 extends axially across the outer surface of the wheel rim 20 from the outboard safety bead 24 to the inboard safety bead 28. A second portion 58 of the chrome plating 56 is shown extending from the outboard tire retaining flange 21 axially across the inner surface of the wheel rim 20 to the inboard tire retaining flange 31. A third portion 59 of the chrome plating 56 completely covers the wheel disc 40, to include the wheel spokes 44.

An interface is formed between the layer of chrome plating 56 and the metal forming the wheel 10. The interface has an edge which defines a boundary between the chrome plating 56 and the wheel metal. The boundary is exposed to air and, under certain conditions, galvanic action may occur along the boundary which could result in corrosion of the wheel surface. Accordingly, a separate coating, which in the preferred embodiment is a layer of an organic material, such as a clear coat or a paint, can be optionally applied over the boundary. The separate coating is applied by a conventional means, such as spraying, and forms a seal over the edge of the interface to prevent corrosion.

As shown in FIG. 1, a first coating 60 extends circumferentially over the inboard surface of the outboard tire bead retaining flange 21. The first coating 60 seals the boundary formed between the edge of the second portion of the chrome plating 58 and the surface of the outboard tire bead retaining flange 21. A second coating 61 extends circumferentially over the outboard safety bead 24 and seals the boundary formed between the edge of the first portion of the chrome plating 57 and the surface of the outboard safety bead 24. A third coating 62 extends circumferentially over the inboard safety bead 28 and seals the boundary formed between the edge of the first portion of the chrome plating 57 and the surface of the inboard safety bead 28. A fourth coating 63 extends circumferentially over the outboard surface of the inboard tire bead retaining flange 31. The fourth coating 63 seals the boundary formed between the edge of the second portion of the chrome plating 58 and the surface of the inboard tire bead retaining flange 31.

While four separate coatings 61, 62, 63 and 64 are shown in FIG. 1, it will be appreciated that the coating can extend across the tire bead seats 22 and 29 to form two separate coatings. Additionally, the entire wheel surface can be sealed with an single coating, such as a clear coat.

Because the layer of chrome plating 56 is excluded from the tire bead seats 22 and 29 and portions of the adjacent wheel surfaces, the tire beads 54 and 55 are urged directly against the metal used to form the wheel rim 20. Accordingly, the air-tight seal formed between the tire beads 54 and 55 and the tire bead seats 22 and 29 is preserved when the wheel 10 is mounted on a vehicle.

It will be appreciated that the invention can be practiced on wheels which are partially chrome plated. For example, for a bimetal wheel having a full face wheel disc cast from a light weight metal attached to a partial steel wheel rim, only the wheel disc may be chrome plated. For such a wheel, the invention would be practiced only on the outboard tire bead seat surface, since only the outboard tire bead seat surface is subject to chrome plating.

It also will be appreciated that, while the preferred embodiment of the invention has been described for chrome plated wheels, the invention can be practiced for other types of plating which are applied to wheel surfaces. It also will be appreciated that the chrome plating 56 can be excluded from more or less of the wheel surface than what has been shown in FIG. 1.

The present invention also contemplates a process for chrome plating the wheel 10 which excludes the tire bead seat surfaces from being chrome plated. In the preferred embodiment, the process includes masking the surface of at least one of the tire bead seats 22 and 29 before chrome plating the wheel 10. It is to be understood that the term "masking" as used herein and in the claims includes all conventional methods for preventing deposition of plating materials upon the masked surface. After the wheel surface is masked, the wheel is prepared and chrome plated with a conventional process. Following the chrome plating process, the masking is removed from the wheel. It will be appreciated that, while the process is described in terms of chrome plating, the process can be practiced with other methods of metal plating.

As described above, the invention also can be practiced on bimetal wheels. For bimetal wheels, the masking can be extended to cover the exposed surface of the weld anchor to prevent plating the surface of the weld anchor. This enhances welding the wheel rim to the wheel disc.

Figure 2:
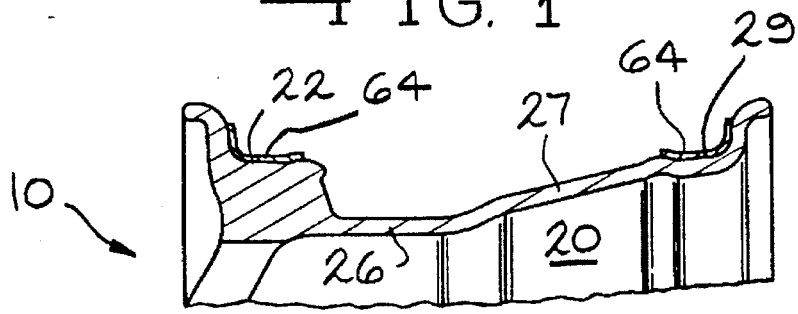
FIG. 2 shows platers' tape masking a portion of the wheel in FIG. 1.

In the preferred embodiment, which is illustrated in FIG. 2, both tire bead seats 22 and 29 are masked by wrapping the tire bead surfaces with plater's tape 64 before starting the plating process. Plater's tape 64 is a known flexible adhesive strip which resists the chemical actions of both the plating process and the preparatory cleaning process. The plater's tape 64 also can be applied to portions of the tire bead retaining flanges 21 and 31 and the safety beads 24 and 28. After the plating process is completed, the plater's tape 64 is removed, exposing the original surfaces of the tire bead seats 22 and 29. Coatings 60, 61, 62 and 63 are applied over the boundaries formed between the edge of the plating and the metal forming the wheel 10. However, this step is optional.

Figure 3:
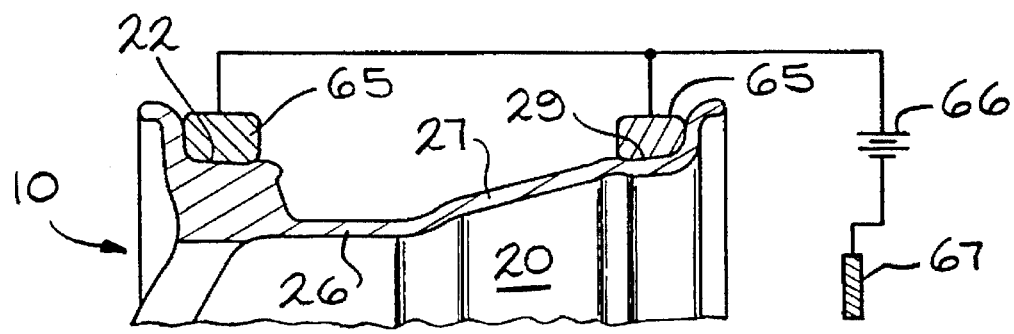
FIG. 3 shows electrodes masking a portion of the wheel in FIG. 1.

When electro-plating is used to plate the wheel 10, masking can include clamping arcuate shaped electrodes 65, as shown in FIG. 3, over the tire bead seats 22 and 29. The electrodes 65 are electrically connected to one terminal of a power supply 66. The other terminal of the power supply 66 is connected to an electrode 67 which is submerged in the chemical bath (not shown). Thus, the electrodes 65 and the chemical bath are given opposite electrical charges causing the plating metal to be electro-deposited on the electrodes 65 instead of the tire bead seats 22 and 29. Upon completion of the plating process, the electrodes 65 are removed from the wheel 10, exposing the original surfaces of the tire bead seats 22 and 29. Coatings 60, 61, 62 and 63 are applied over the boundaries formed between the edge of the plating and the metal forming the wheel 10. However, this step is optional.

Figure 4:
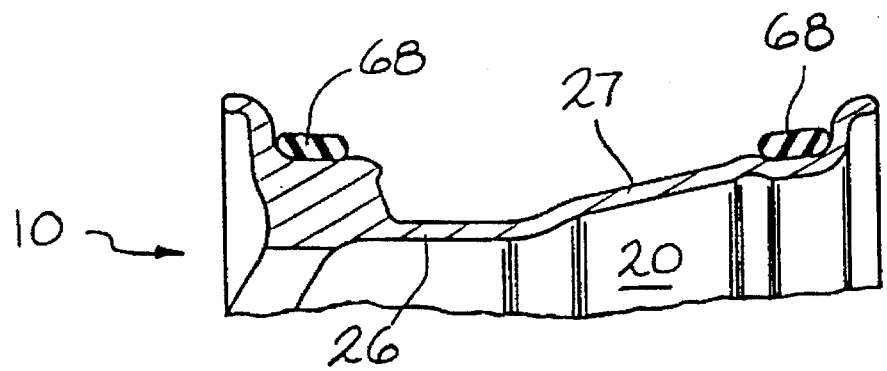
FIG. 4 shows elastic bands masking a portion to the wheel in FIG. 1.

It is also contemplated that a pair of ring-shaped elastic bands 68, as shown in FIG. 4, can be used for masking the tire bead seats 22 and 29. The elastic bands 68 are formed from a material which is resistant to the chemicals used in both the cleaning and chrome plating processes and have a width which is equal to or greater than the tire bead seat width. The elastic bands 68 are placed over the tire bead seats 22 and 29 before beginning the cleaning and plating processes. The elastic bands 68 cover the tire bead seats 22 and 29, thereby preventing any deposition of plating metal. Upon completion of the plating process, the elastic bands 68 are removed from the wheel 10, exposing the original surfaces of the tire bead seats 22 and 29. Coatings 60, 61, 62 and 63 are applied over the boundaries formed between the edge of the plating and the metal forming the wheel 10. However, this step is optional.

Figure 5:
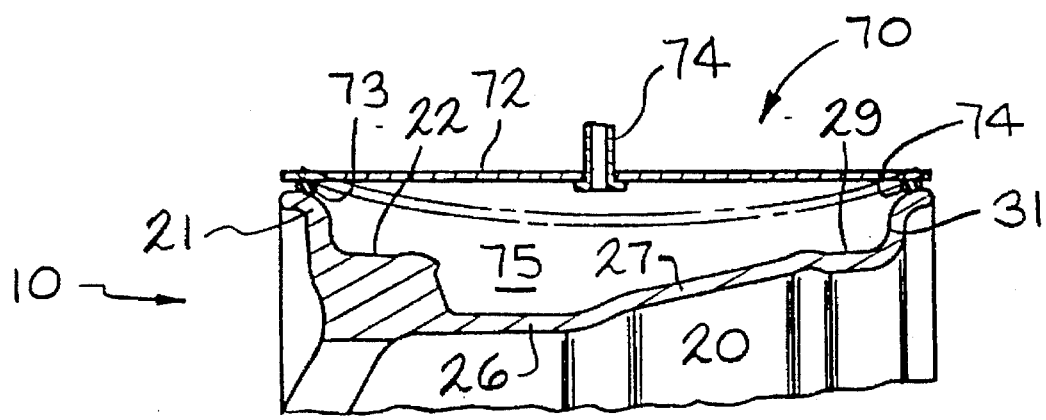
FIG. 5 shows an apparatus for masking a portion to the wheel in FIG. 1.

An apparatus 70, as shown in FIG. 5, also can be used to mask the tire bead seats 22 and 29. The apparatus 70 includes a thin sleeve 72 formed from a flexible metal. Outboard and inboard annular seals, 73 and 74, respectively, are secured to ends of the inside surface of the sleeve 72. The seals are formed from a resilient material which is resistant to the chemicals used in the cleaning and plating processes. The apparatus 70 is sized such that the sleeve 72 can be positioned over the tire retaining flanges 21 and 31 with an interference fit formed between the seals 73 and 74 and the flanges 21 and 31. Thus, the seals 73 and 74 are slightly compressed to form a seal with the tire retaining flanges 21 and 31. A tube 74 extends through the sleeve and forms an air-tight seal therewith. The tube 74 is attached to a means for evacuating air (not shown).

Before plating the wheel 10, the sleeve 72 is positioned over the wheel rim 20. The seals 73 and 74 form a seal between the sleeve 72 and the tire retaining flanges 21 and 31 and define an annular chamber 75 between the sleeve 72 and the wheel rim 20. The air in the chamber 75 is partially evacuated therefrom through the tube 74. The evacuation of air from the chamber 75 causes the sleeve 72 to be compressed to the shape shown by the dashed lines in FIG. 5 by atmospheric pressure, which further compresses the seals 73 and 74. The resulting atmospheric seal formed between the apparatus 70 and the wheel 10 is sufficient to prevent any of the chemicals used in the cleaning and plating processes from entering the chamber 75.

Once the atmospheric seal is established, the wheel 10 is plated by a conventional process. The sleeve 72 and seals 73 and 74 exclude the outer surface of the wheel rim 20, which includes the tire bead seats 22 and 29, from plating. However, as shown in FIG. 5, all the portions of the wheel 10 which will remain visible after a tire is mounted thereon are exposed to the plating process. After the plating process is completed, atmospheric air is vented into the chamber 75 releasing the atmospheric seal formed between the apparatus 70 and the wheel 10 and allowing removal of the apparatus 70 from the wheel 10. Coatings 60, 61, 62 and 63 are applied over the boundaries formed between the edge of the plating and the metal forming the wheel 10. However, this step is optional.

Figure 6:
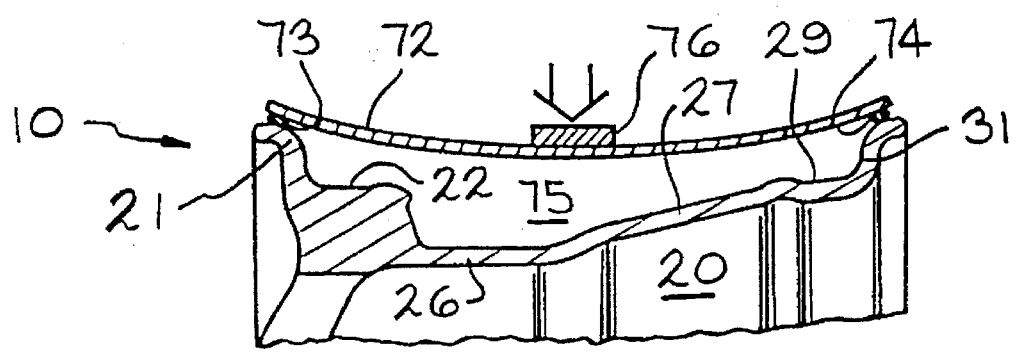
FIG. 6 shows an alternate embodiment of the apparatus shown in FIG. 5.

An alternate embodiment of the apparatus 70 is illustrated in FIG. 6. Components in FIG. 6 which are the same in as shown in FIG. 5 have the same numerical designator. In FIG. 6, a mechanical means, such as a clamp 76, exerts a radially inwardly directed force, shown as an arrow, upon the sleeve 72. The force compresses the center portion of the sleeve 72, which further compresses the resilient seals 73 and 74. The resulting seal between the apparatus 70 and the wheel 10 is sufficient to prevent any of the chemicals used in the cleaning and plating processes from entering the chamber 75. Once the seal is established, the alternate embodiment of the apparatus 70 is used as described above. After the sleeve 72 is removed from the wheel 10, coatings 60, 61, 62 and are applied over the boundaries formed between the edge of the plating and the metal forming the wheel 10. However, this step is optional.

Figure 7:
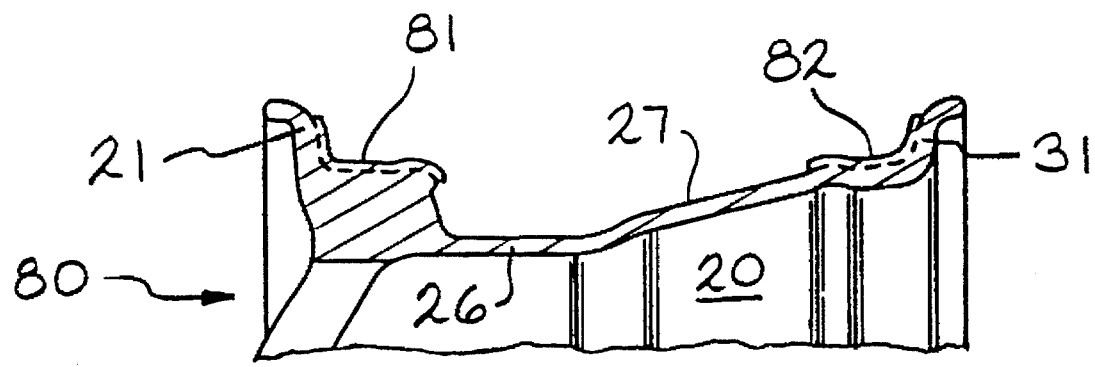
FIG. 7 illustrates an alternate method for practicing the invention shown in FIG. 1.

Another embodiment of the process for excluding plating from the tire bead seats is illustrated in FIG. 7. The embodiment is shown applied to a vehicle wheel 80. Portions of the wheel 80 which are the same as the wheel 10 shown in FIG. 1 are identified with the same numerical designator. The wheel 80 includes outboard and inboard tire bead seats 81 and 82 which have an oversized diameter. The bead seats 81 and 82 can be formed by removing less metal from the wheel casting during machining of the wheel 80. Alternately, machining of the bead seats 81 and 82 can omitted.

The wheel 80 is plated by a conventional process during which all the wheel surfaces, including the tire bead seats 81 and 82, are plated. Following plating, the tire bead seats 81 and 82 are turned to a final diameter, by a conventional process, such as turning the wheel on a lathe. The final tire bead seat diameter is shown by the dashed lines in FIG. 7. During the turning, the plated portions of the bead seats 81 and 82 are removed, exposing the original wheel metal. Coatings 60, 61, 62 and 63 are applied over the boundaries formed between the edge of the plating and the metal forming the wheel 10. However, this step is optional.

Figure 8:
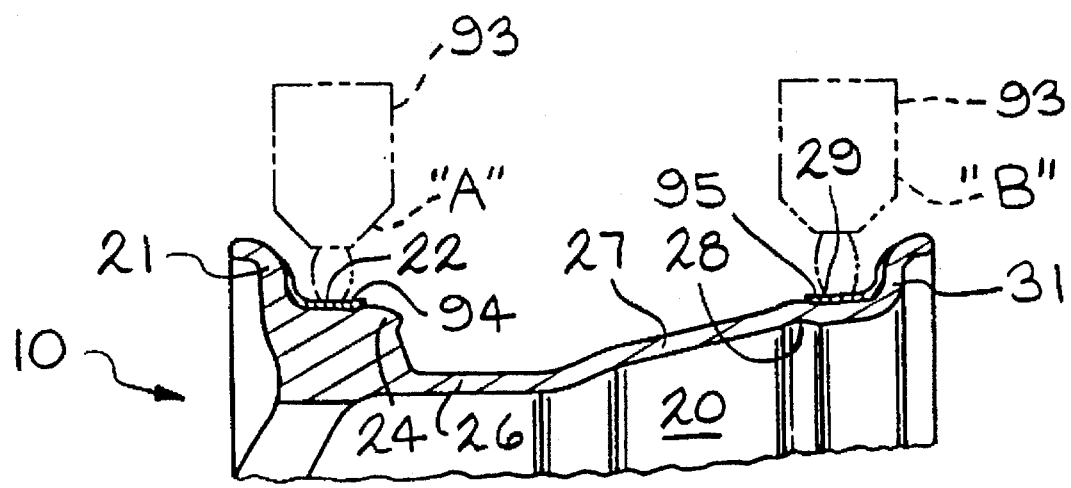
FIG. 8 illustrates thermally spraying a masking material onto a portion to the wheel in FIG. 1.

An alternate embodiment of the process for excluding plating from the tire bead seats is illustrated in FIG. 8. This embodiment contemplates thermally spraying a masking material onto the surfaces of tire bead seats 22 and 29 of the wheel 10. A masking material is selected which is compatible with the alloy forming the wheel 10 but will not form a bond with the metals used in the plating process. Thus, the plating will not adhere to the masking material. For example, a ceramic can be used as the masking material on light weight wheels. More specifically, alumina could be sprayed onto the bead seats of an aluminum alloy wheel.

The masking material is sprayed with a conventional thermal spray gun 93, which is shown in phantom in FIG. 8. For example, an arc plasma spray gun can be used. The spray gun 93 is moved to position "A" to deposit a layer of masking material 94 on the outboard tire bead seat 22. As shown in FIG. 8, the layer of masking material 94 can extend onto a portion of the outboard tire bead retaining flange 21 and a portion of the outboard safety bead 24. The spray gun 93 can be moved axially while the wheel 90 is rotated to assure forming a uniform layer 94. The spray gun 93 is then moved to position "B" to deposit a layer of masking material 95 on the outboard tire bead seat 29. As shown in FIG. 8, the layer of masking material 95 can extend onto a portion of the inboard safety bead 28 and a portion of the inboard tire bead retaining flange 31. Alternately, two thermal spray guns (not shown) can be used to simultaneously deposit both layers 91 and 92. After depositing the layers of masking material 94 and 95, the wheel 10 is plated by a conventional process. Because the plating does not adhere to the masking material, no plating is deposited on the tire bead seats 22 and 29.

The masking material and the plating metal define a boundary which is exposed to air. If galvanic action could occur between the masking material and the plating metal, coatings 60, 61, 62 and 63 can be applied over the boundaries formed between the masking material and the edge of the plating metal. However, this step is optional.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle wheel comprising:
    an annular wheel rim defining a wheel rim surface, said wheel rim having annular outboard and inboard tire bead seats formed therein for supporting outboard and inboard tire walls, respectively;
    a generally circular wheel disc disposed across said wheel rim and defining a wheel disc surface; and
    a layer of metal plating formed on a portion of at least one of said wheel rim and disc surfaces, said portion excluding a portion of at least one of said tire bead seats.

2. A vehicle wheel as described in claim 1 wherein said layer of metal plating includes chromium.

3. A vehicle wheel as described in claim 1 wherein the wheel is formed from a metal and said layer of metal plating forms an interface with said wheel metal, said interface having an edge which defines a boundary between said wheel metal and said layer of metal plating, and further wherein the wheel includes a separate coating extending over a portion of said non-plated bead seat and said boundary to seal said edge of said interface.

4. A vehicle wheel as described in claim 3 wherein said separate coating includes an organic material.

5. A vehicle wheel as described in claim 4 wherein said organic material is a clear coating.

6. A vehicle wheel as described in claim 4 wherein said organic material is a paint.

* * * * *